Patented May 3, 1932

1,856,802

UNITED STATES PATENT OFFICE

OSCAR BALLY, PAUL GROSSMANN, AND FRIEDRICH FELIX, OF BASEL, SWITZERLAND, ASSIGNORS TO THE FIRM OF SOCIETY OF CHEMICAL INDUSTRY IN BASLE, OF BASEL, SWITZERLAND

DYESTUFFS OF THE ANTHRAQUINONE SERIES AND PROCESS OF MAKING SAME

No Drawing. Application filed January 27, 1928, Serial No. 250,080, and in Switzerland February 12, 1927.

The present invention relates to the manufacture of new products which are suitable for the dyeing of the most various materials. It comprises the new products, the process of making these products, and the material that has been dyed with the new dyestuffs.

These new dyestuffs are obtained by causing a product of the general formula:—

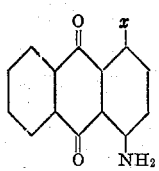

wherein $x$ stands for OH, $OCH_3$ or $NH_2$, to interact with aromatic diamine compounds, such as phenylenediamine, naphthylenediamine, benzidine or the like, or a derivative, homologue or substitution product thereof. There are produced 1-arylido-4-aminoanthraquinones, which contain in the aryl-nucleus at least one amino-group or a group derived from the amino-group.

By treating these new 1-arylido-4-aminoanthraquinones by an agent capable of introducing a sulphonic acid group, such as a sulphonating agent or an aldehyde bisulfite, they may be converted into new sulphonic acids. The new products correspond with the general formula:—

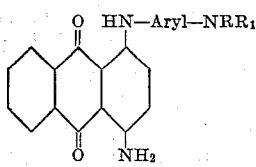

wherein R and $R_1$ signify hydrogen, alkyl or acidyl and wherein the anthraquinone and the aryl groupings may or may not contain sulfo groups. They are dark powders which dissolve in sulfuric acid with violet to blue and green-blue colorations, and in water or organic solvents to blue to greenish-blue solutions, dyeing wool or cellulose esters and ethers, such as acetate silk or varnishes or lacquers, similar tints.

The following examples illustrate the invention, the parts being by weight:—

Example 1

25 parts of 1-methoxy-4-amino-anthraquinone are heated with 40 parts of para-phenylenediamine and 100 parts of dimethylaniline at 180° C. until a sample in alcohol shows no further change of tint. Then 140 parts of methyl alcohol are added at 100° C. and the product is filtered after it has cooled. The 1-(4'-amino)-phenylamino-4-amino-anthraquinone separates in good yield and pure form. It is filtered and dried. It melts at 247–248° C.; dissolves in organic solvents to a greenish blue solution and in concentrated sulphuric acid to a violet solution and dyes acetate silk greenish blue tints. The formula of the new product is:—

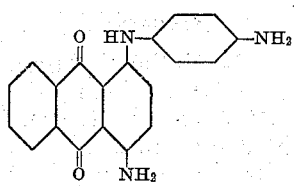

Instead of dimethylaniline, nitrobenzene, orthodichlorbenzene, naphthalene or another solvent may be used. So also for the para-phenylenediamine, the ortho- or meta-compound may be substituted, whereby pure blue acetate silk dyestuffs are obtained; or dimethyl - para - phenylenediamine, meta-toluylenediamine, acetyl-para-phenylenediamine, benzidine, 5-amino-2-methylbenzimidazol or the like may be used. The formulas of some of these new compounds thus obtained are

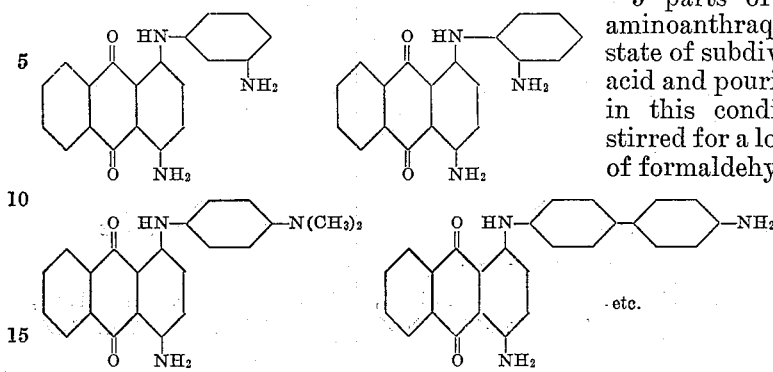

All these compounds dissolve in concentrated sulfuric acid with violet to blue coloration.

Example 2

24 parts of 1-hydroxy-4-aminoanthraquinone are heated together with 12 parts of boric acid, 43 parts of para-phenylenediamine and 100 parts of dimethylaniline at 150° C. until a sample in alcohol no longer shows an appreciable shifting of the colour towards blue. The dimethylaniline is then distilled with steam, the residue filtered and the solid matter dried and crystallized from sulphuric acid or aniline, whereby the same product is obtained as is described in Example 1.

Example 3

5 parts of 1-(4'-amino)-phenylamino-4-aminoanthraquinone are heated in 35 parts of oleum of 7 per cent. strength at 40–50° C. until a sample is completely soluble in dilute ammonia solution. The mass is then poured into ice-water, common salt is added and the whole filtered, the solid matter being washed with salt solution until neutral. This product dissolves in water to a greenish blue solution; in concentrated sulfuric acid to a violet solution. It dyes non-mordanted wool in an acid bath fast, pure greenish blue tints. The position where the sulfo group enters the molecule is not known.

Example 4

5 parts of 1-(4'-dimethylamino)-phenylamino-4-aminoanthraquinone are heated in presence of 50 parts of nitrobenzene with 6 parts of chlorosulfonic acid at 90–100° C. until a sample dissolves completely in dilute ammonia. The nitrobenzene is distilled with steam, common salt is added, the precipitated dyestuff is filtered and washed with dilute salt solution until neutral. This sulfonation product dyes wool tints which are somewhat more greenish than those obtained with the dyestuff of the preceding examples.

In an analogous manner the products made as described in the preceding examples can be sulfonated, whereby red-blue to blue-green and green dyeing dyestuffs are obtained.

Example 5

5 parts of 1-(4'-amino)-phenylamino-4-aminoanthraquinone are brought into a fine state of subdivision by dissolution in sulfuric acid and pouring the solution into water, and in this condition the amino-derivative is stirred for a long time at 80° C. with an excess of formaldehyde bisulfite solution. The mass is then diluted with hot water, separated from some undissolved matter and the dyestuff is salted out from the filtrate. The new sulfonic acid dissolves in water and in sulfuric acid with green-blue coloration; it dyes wool uniform, fast blue-green tints.

Example 6

15 parts of 1-(4'-amino)-phenylamino-4-aminoanthraquinone are stirred with sulfite cellulose lye or a sulfonation product of the distillation residue obtained in the manufacture of benzaldehyde or turpentine to produce a uniform paste of 20 per cent. strength. 5 parts of this paste are stirred with about the same quantity of soap solution of 6 per cent. strength at about 50° C. and then diluted with lukewarm water so as to form 300 parts. 10 parts of acetate silk are then entered, the temperature is raised within ¾ hour to 75–80° C. and the silk is handled for about ¾ hour at this temperature. Washing and drying follow. The acetate silk is dyed a beautiful green-blue, which is fast.

What we claim is:—

1. A manufacture of new dyestuffs by causing a product of the general formula:—

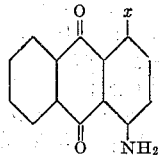

wherein $x$ stands for OH, OCH$_3$ or NH$_2$, to interact at a raised temperature with an aromatic diamine compound in which at least one of the amino-groups is present as an unsubstituted NH$_2$-group.

2. A manufacture of new dyestuffs by causing a product of the general formula:—

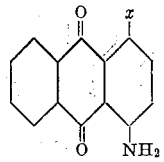

wherein $x$ stands for OH, OCH$_3$ or NH$_2$, to interact at a raised temperature with an aromatic diamine compound in which at least one of the amino-groups is present as an unsubstituted $NH_2$-group, and by treating the products thus obtained with agents which are adapted to introduce sulfonic acid groups.

3. A manufacture of new dyestuffs by causing a product of the general formula:—

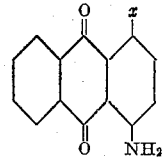

wherein $x$ stands for $OH$, $OCH_3$ or $NH_2$, to interact at a raised temperature with an aromatic diamine compound of the benzene series in which at least one of the amino-groups is present as an unsubstituted $NH_2$-group.

4. A manufacture of new dyestuffs by causing a product of the general formula:—

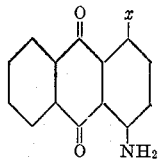

wherein $x$ stands for $OH$, $OCH_3$ or $NH_2$, to interact at a raised temperature with a p-phenylenediamine compound in which at least one of the amino-groups is present as an unsubstituted $NH_2$-group.

5. A manufacture of new dyestuffs by causing a product of the general formula:—

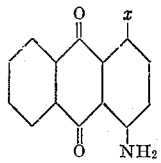

wherein $x$ stands for $OH$, $OCH_3$ or $NH_2$, to interact at a raised temperature with p-phenylenediamine.

6. As new products the 1-arylido-4-aminoanthraquinones which contain in the aryl-nucleus at least one amino-group, which products correspond with the general formula:—

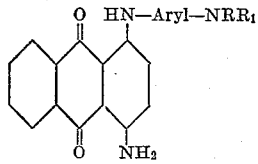

wherein the positions 2, 3, 5, 6, 7 and 8 are occupied by hydrogen atoms $R$ and $R_1$ signifying hydrogen, alkyl or acidyl and wherein the anthraquinone and the aryl groupings may or may not contain sulfo-groups, and which products dissolve in sulfuric acid with violet to blue and green-blue colorations, in water or organic solvents to blue to grenish-blue solutions, dyeing wool or cellulose esters and ethers, such as acetate silk or varnishes or lacquers, similar tints.

7. As new products the 1-arylido-4-aminoanthraquinones which contain in the aryl-nucleus at least one amino-group, which products correspond with the general formula:—

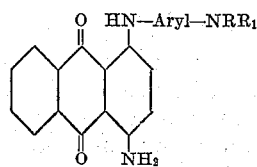

wherein the positions 2, 3, 5, 6, 7 and 8 are occupied by hydrogen atoms and $R$ and $R_1$ signify hydrogen, alkyl or acidyl, dissolving in sulfuric acid with violet colorations, in organic solvents to blue to greenish-blue solutions, and dyeing cellulose esters and ethers, such as acetate silk or varnishes or lacquers, similar tints.

8. As new products the 1-arylido-4-aminoanthraquinones which contain in the aryl-nucleus at least one amino-group, which products correspond with the general formula:—

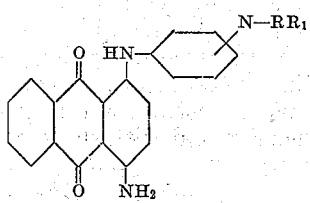

wherein the positions 2, 3, 5, 6, 7 and 8 are occupied by hydrogen atoms and $R$ and $R_1$ signify hydrogen, alkyl or acidyl, dissolving in sulfuric acid with violet colorations, in organic solvents to blue to greenish-blue solutions, and dyeing cellulose esters and ethers, such as acetate silk or varnishes or lacquers, similar tints.

9. As new products the 1-arylido-4-aminoanthraquinones which contain in the aryl-nucleus at least one amino-group, which products correspond with the general formula:—

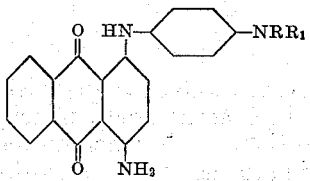

wherein the positions 2, 3, 5, 6, 7 and 8 are occupied by hydrogen atoms and $R$ and $R_1$, signify hydrogen, alkyl or acidyl, dissolving in sulfuric acid with violet colorations, in organic solvents to blue to greenish-blue solutions, and dyeing cellulose esters and ethers, such as acetate silk or varnishes or lacquers, similar tints.

10. As a new product the 1-arylido-4-aminoanthraquinone which contains in the aryl-nucleus at least one amino-group, which product corresponds with the formula:—

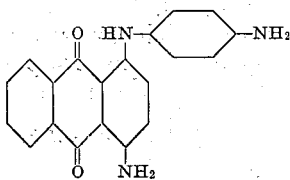

dissolving in sulfuric acid with violet coloration, in organic solvents to greenish-blue solutions, dyeing cellulose esters and ethers, such as acetate silk or varnish or lacquers, fast greenish-blue.

11. As new products, the 1-arylido-4-aminoanthraquinones which contain in the aryl nucleus at least one amino-group, which products correspond with the formula:—

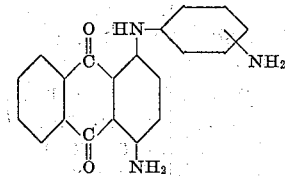

wherein the anthraquinone and aryl nuclei may contain sulpho groups.

12. As new products, the 1-arylido-4-aminoanthraquinones which contain in the aryl nucleus at least one amino-group, which products correspond with the formula:

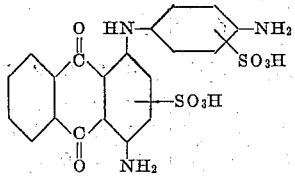

13. As a new product the 1-arylido-4-aminoanthraquinone the sodium salt of which corresponds to the formula:

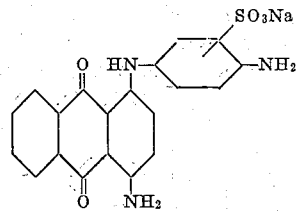

and dissolves in water to a greenish-blue solution, and in concentrated sulfuric acid to a violet solution, dyeing nonmordanted wool in an acid bath fast, pure greenish-blue tints.

14. As a new product the 1-arylido-4-amino-anthraquinone the sodium salt of which corresponds to the formula:

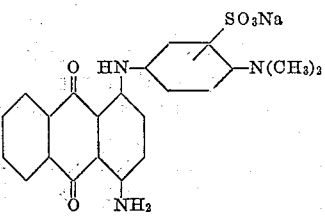

and dissolved in water to a greenish-blue solution, and in concentrated sulfuric acid to a violet solution, dyeing nonmordanted wool in an acid bath fast, pure greenish blue tints.

In witness whereof we have hereunto signed our names this 16th day of January, 1928.

OSCAR BALLY.
PAUL GROSSMANN.
FRIEDRICH FELIX.